United States Patent
Bleijenberg et al.

(10) Patent No.: US 6,943,223 B1
(45) Date of Patent: *Sep. 13, 2005

(54) CONTROLLED SHEAR AND TURBULENCE FLOW PATTERN WITHIN A LIQUID IN A VESSEL

(75) Inventors: Karel Cornelis Bleijenberg, Mars, PA (US); Grazyna Petela, Calgary (CA)

(73) Assignee: NOVA Chemicals Inc., Moon Township, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/832,538

(22) Filed: Apr. 27, 2004

(51) Int. Cl.$^7$ ................................ C08F 2/12
(52) U.S. Cl. ............... 526/88; 526/67; 526/202; 526/909; 523/319; 521/56
(58) Field of Search ............ 523/319; 526/67, 526/88, 909, 202; 521/56

(56) References Cited

U.S. PATENT DOCUMENTS

| | | |
|---|---|---|
| 4,427,794 A | 1/1984 | Lange et al. |
| 4,444,961 A | 4/1984 | Timm |
| 4,623,706 A | 11/1986 | Timm et al. |
| 4,666,673 A | 5/1987 | Timm |
| 4,680,320 A * | 7/1987 | Uku et al. .............. 523/313 |
| 5,061,741 A | 10/1991 | Miyata et al. |
| 6,610,798 B1 | 8/2003 | Bleijenberg et al. |
| 6,727,328 B1 * | 4/2004 | Bleijenberg et al. ........ 526/88 |

* cited by examiner

Primary Examiner—Fred Teskin
(74) Attorney, Agent, or Firm—Suzanne Kikel, Patent Agent

(57) ABSTRACT

The present invention provides a process to create without mechanical agitation a zone of low shear, low turbulence flow pattern within a continuous liquid phase contained in a vessel and comprising a dispersed phase consisting of particles or immiscible liquid droplets which have a density different from and should be distributed within the continuous phase without excessive agglomeration or breakups in order to largely preserve the initial particle size distribution, by a continuous or periodic re-circulation of at least a part of the continuous phase which is preferably free of dispersed particles or droplets.

26 Claims, 6 Drawing Sheets

1mm

CONTROLLED SHEAR AND TURBULENCE FLOW PATTERN WITHIN A LIQUID IN A VESSEL

FIELD OF THE INVENTION

The present invention relates to a method to create without mechanical agitation a low shear low turbulence flow pattern within a continuous liquid phase contained in a vessel, and comprising a dispersed phase, by continuously or periodically withdrawing at least a portion of the continuous phase from the vessel and re-injecting it above or, preferably, below the free surface, in a direction opposite to the displacement of the dispersed phase, at a rate to substantially prevent flotation or submergence of the dispersed phase. Typically the dispersed phase includes particles or droplets immiscible with a continuous phase, which need to be distributed within the continuous phase without excessive (e.g. not more than 15%, preferably not more than 8%) breakups or agglomeration in order to preserve the initial size distribution for subsequent processing.

BACKGROUND OF THE INVENTION

The manufacture of very uniform particles of different substances is of commercial significance. In the field of polymer chemistry the creation of uniform spheres of polymers is useful in a number of applications such as calibration of scientific equipment (e.g. Electron Microscopes) and in, for example, the manufacture of uniform size beads of ion exchange resins.

There are a number of patents, which teach the formation of uniform droplets of one or more monomers in a continuous medium and these uniform size monomer droplets are further subjected to conventional batch emulsion or suspension polymerization. The polymerization includes some sort of mechanical agitation. Typically, mechanical agitators generate a shear gradient low at the center of the agitator and higher at the peripheral edge of the agitator. As a result, the mono-sized droplets of monomer are subject to a non-uniform shear field under conventional mechanical agitation and this tends to broaden the particle size distribution towards a bell curve type distribution (e.g. Gaussian distribution).

U.S. Pat. No. 4,623,706 issued Nov. 18, 1986 to Timm et al. assigned to the Dow Chemical Company discloses a process in which monomers are atomized into a gas phase containing column. Part of the gas is a cationic polymerization initiator. In one embodiment the dispersed monomer droplets travel through the gas phase column and are substantially polymerized before leaving the column (Col. 6 lines 16 and 44 and 45). In another embodiment the droplets are sprayed onto a wall wetted with a continuous phase, which flows into a second reactor where the droplets are polymerized using conventional emulsion or suspension polymerization techniques. The specification discloses the use of a mechanical agitator (41) in the reactor. The reference teaches away from the subject mater of the present invention.

U.S. Pat. No. 4,444,961 issued Apr. 24, 1984 to Timm assigned to The Dow Chemical Company teaches a process for producing uniform droplets of one or more monomers in a continuous liquid phase. The monomer droplets are injected into a column containing the continuous phase. In the column the continuous phase may flow co-currently or counter currently to the movement (e.g. floatation or sedimentation) of the droplets or be static (Col. 7 lines 19–33). However the conditions in the column are such that no or very low polymerization occurs (Col. 7 lines 34 and 35 and Col. 13 lines 23 to 30) and the droplets are subsequently transferred to a conventional emulsion or suspension reactor. The turbulence level in the reactor is maintained low to prevent agglomeration, however the reactor clearly contains some type of agitation (Col. 14 lines 16 to 29). Again the reference teaches away from the subject matter of the present invention.

U.S. Pat. No. 4,666,673 issued May 19, 1987 to Timm assigned to The Dow Chemical Company teaches a process in which uniform droplets of one or more monomers are injected into a continuous phase. The continuous phase is in a collection zone and the resulting droplets are fed to a conventional emulsion or suspension reactor. Within the collection zone the flow of the continuous medium is described in a similar manner as in U.S. Pat. No. 4,444,961 (Col. 5 lines 27 to 65). Again the resulting droplets are further fed to a conventional reactor, which is described in a similar manner as in U.S. Pat. No. 4,444,961 (Col. 8 lines 46 to 60). The disclosure teaches away from the present invention.

U.S. Pat. No. 4,427,794 issued Jan. 24, 1984 to Lange et al. assigned to Bayer Aktiengesellschaft teaches a process for producing uniform droplets of monomers which are encased within a shell within a continuous liquid phase. The monomer droplets are then transferred to a conventional emulsion or suspension reactor having mechanical agitation. The patent teaches away from the subject mater of the present invention.

U.S. Pat. No. 5,061,741 issued Oct. 29, 1991 to Miyata et al. assigned to Mitsubishi Kasei Corporation teaches a process for preparing uniform droplets of one or more monomers in a continuous phase. The resulting droplets are fed to a conventional emulsion or suspension reactor. The disclosure recognizes the problems with particle break up or agglomeration and recognizes the need to use mild stirring, but teaches mechanical agitation. The patent teaches away from the subject matter of the present invention.

U.S. Pat. No. 6,610,798 issued Aug. 26, 2003 to the same inventors as the currently submitted application, assigned to NOVA Chemicals Inc., discloses a process for producing mono-sized monomer droplets which are polymerized in a low shear zone in a reactor created without mechanical agitation, by injecting a gas inert to the reactor contents into the continuous phase. The patent does not teach re-circulating a portion of the continuous phase to create such a zone.

The applicants have been unable to locate any art, which discloses the subject matter of the present invention (i.e. the re-circulation of all or a portion of the continuous liquid phase to create a low shear, low turbulence, (preferably laminar), flow pattern within a continuous phase contained in a vessel). If the continuous phase optionally further comprises a dispersed phase, the present invention provides the mechanism to create, with no mechanical agitation, a laminar low shear flow pattern to suspend and to distribute, preferably relatively uniformly, the dispersed phase within a volume or a portion of the continuous phase, with minimum interaction between particles during subsequent processing. The application of such a flow pattern can be useful in any process where the substrate (liquid or solid) is dispersed as a suspension or an emulsion or as a particle cloud in an immiscible continuous phase and the dispersed phase may be further batch processed or undergo a chemical reaction (e.g. polymerization), with the requirement to substantially (e.g. 90%, most preferably 95%) preserve the initial size distribution.

In conventional processes, a phase to be processed, dispersed in a continuous liquid phase is usually subjected to some form of mechanical agitation. If the initial particle size distribution of the dispersed phase, which may have been obtained by any means of disintegration including pressure atomization, extrusion, mechanical agitation, jet cutting, etc., is to be maintained during further processing or chemical reaction, the flow pattern of the continuous phase in a rector needs to have low enough shear and low turbulence level so as not to cause particles to agglomerate or not to cause further particle break up. With conventional mechanical agitation it is difficult to generate such a low turbulence, uniform shear field as the velocity gradient along an agitator blade is a function of the liquid properties, the speed of rotation and the distance from the agitator shaft. Accordingly, the shear in the reactor vessel is highly non-uniform and generally the level of turbulence is high and this tends to change the initial particle size distribution into a new, usually a normal, distribution of particle sizes.

The present invention seeks to provide a method of generating a low shear, low turbulence, in some applications preferably laminar, zone within a continuous liquid phase in a vessel, with no mechanical agitation in the reactor. If dispersed particles are comprised in the continuous liquid phase, they flow within this zone with minimum mutual interaction to minimize agglomeration and breakups, remaining submerged and thoroughly (uniformly) distributed within the continuous liquid volume during subsequent processing. In such environment, the initial particle size distribution can be largely preserved.

The method can be applied in processes where density ratios between dispersed and continuous phases are higher or lower than 1 within the range of ±20%.

SUMMARY OF THE INVENTION

The present invention provides a process for creating without mechanical agitation a flow pattern in a continuous liquid phase contained in a reaction vessel and comprising a dispersed phase selected from the group consisting of solid particles which can also be coated or immiscible liquid droplets, the dispersed phase having a density different from the density of the continuous phase and undergoing processing during which the particles or droplets need to remain submerged and uniformly distributed within the continuous phase, by continuously or periodically withdrawing a portion of the continuous phase and injecting it into the reactor above or, preferably, below the free surface of the continuous phase in a direction opposite to the natural displacement/motion of the dispersed phase driven by density difference, at a rate to substantially prevent flotation or sedimentation or coalescence of the dispersed phase.

The present invention further provides a process for creating without mechanical agitation a flow pattern in a continuous liquid phase contained in a reaction vessel and comprising 0.1 to 60 volume % of a dispersed phase selected from the group consisting of solid particles which can also be coated or immiscible liquid droplets, the dispersed phase having an average particle diameter from 0.1 mm to 10 mm and a density different from the continuous phase and undergoing processing during which the initial particle size distribution of the particles or droplets need to be reduced and the particles need to remain submerged and uniformly distributed within the continuous phase, comprising continuously or periodically withdrawing and re-injecting into selected part(s) of the reaction vessel one or more streams of continuous phase to cause a secondary break up of at least 85% of the dispersed phase droplet population creating a smaller size of the overall particle or droplet size distribution of the dispersed phase.

DETAILED DESCRIPTION

Figure 1:
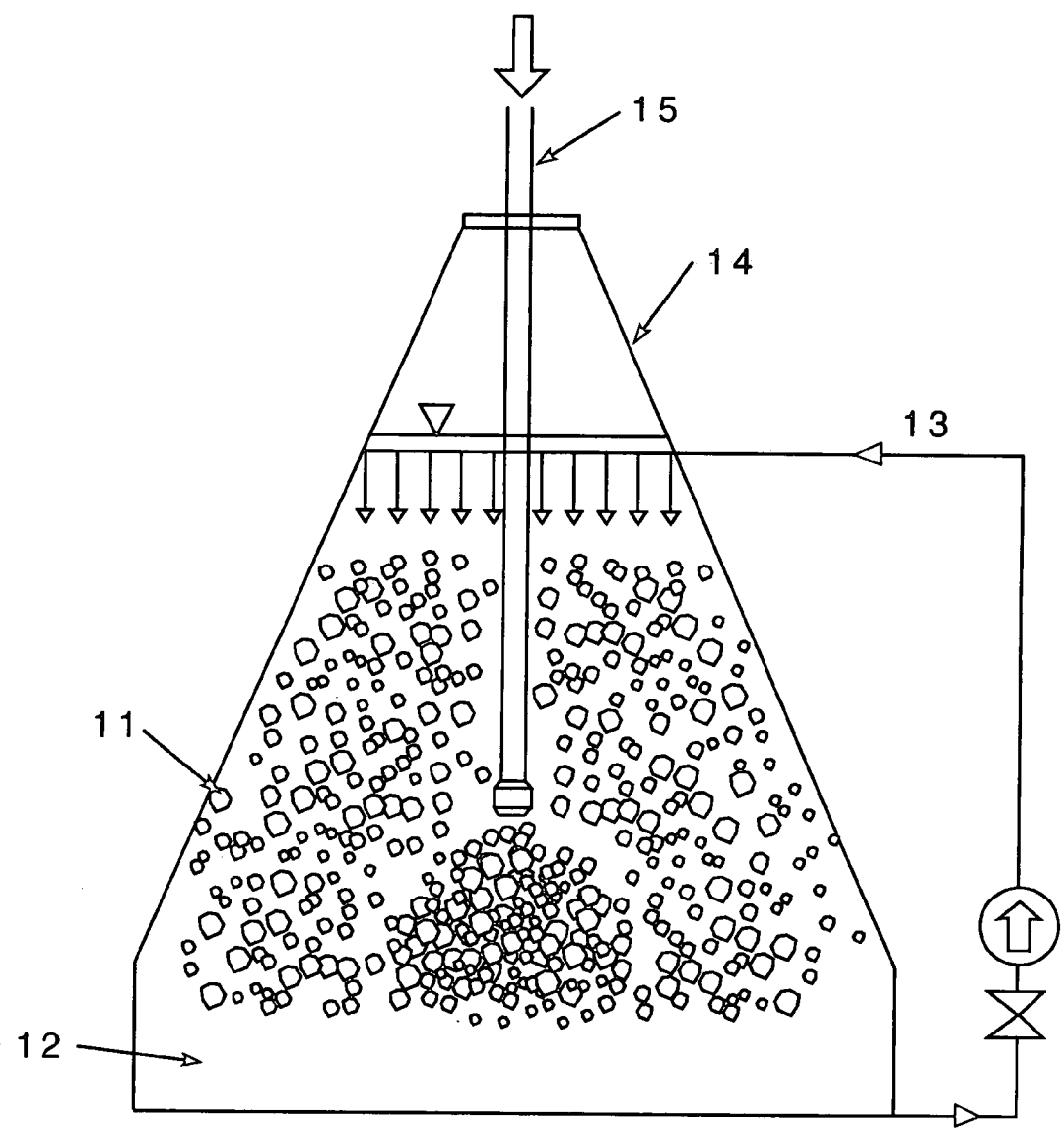
FIG. 1 is a schematic diagram of the vessel used to conduct the experiments.

In the present invention the continuous phase can be either Newtonian or non-Newtonian liquids, immiscible with the dispersed phase.

The term "immiscible" meaning less than about 1 weight percent of the dispersed liquid is miscible (or soluble) in the suspending liquid (i.e. the continuous phase does not solvate more than about 1 weight percent of the dispersed phase). Preferably less than about 0.1 weight percent of the dispersed phase is miscible in the suspending continuous liquid.

As used in this specification non-Newtonian means a liquid, which does not have a linear relationship between shear stress and fluid strain rate. Generally non-Newtonian liquids exhibit shear thinning (pseudoplastic) or shear thickening (dilatant). All gases, water (salt and fresh), the monomers or mixtures of monomers, and most unpolymerized hydrocarbons are Newtonian liquids.

The dispersed phase can comprise liquid droplets which are Newtonian or non-Newtonian visco-elastic liquids, or can comprise solid or coated particles or coated liquid droplets, (e.g. gelatin or a coating applied using, for example, encapsulating concentric nozzles), or droplets of a liquid-solid mixture (e.g. slurry). In one preferred embodiment the dispersed phase are pressure-atomized droplets of a partially polymerized mixture of one or more monomers. The pressure atomization process is more fully described for example in U.S. Pat. No. 6,610,798 B1 issued Aug. 26, 2003 to the inventors of the present patent application and assigned to NOVA Chemicals Inc.

As used herein visco-elastic liquid means a liquid that has conjoint viscous and elastic properties. Typically these liquids tend to be more viscous than water and if deformed under shear will tend to return to their pre-shear condition if the shear is removed.

Newtonian liquids forming the dispersed phase suitable for use in the present invention may be the monomers listed below (e.g. polymerized 0% to a low, typically less than 5% conversion), or mixture of monomers including one or more monomers, which can be emulsion or suspension polymerized.

Typically the one or more monomers may be selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

Suitable vinyl aromatic monomers include styrene, alpha methyl styrene and para methyl styrene. Suitable alkyl esters of $C_{1-6}$ monocarboxylic acids include methyl methacrylate, ethyl methacrylate, butyl methacrylate, methyl acrylate, ethyl acrylate and butyl acrylate. In one embodiment of the present invention the dispersed phase comprises from 100 to 60 weight % of styrene and from 0 to 40 weight % of one or more monomers selected from the group consisting of methyl methacrylate, ethyl methacrylate, butyl methacrylate, methyl acrylate, ethyl acrylate, and butyl acrylate.

Non-Newtonian and visco-elastic liquids forming the dispersed phase may be partially polymerized monomers, typically polymerized at least to 5% generally from 5 to 45% preferably from 10 to 45% conversion or solutions of monomers listed below having dissolved there in polymers, generally of one or more of the solvent monomers, in an amount typically not less than 5 weight %, generally from 5 to 45 weight %, preferably from 10 to 45 weight %.

Typically the polymer will be a co- or homo-polymer of the monomers listed below. However other polymers may be used such as polyolefins (e.g. polyethylene), polycarbonates (polyphenylene oxides) and impact (rubber modified) forms of polymers such as high impact polystyrene (HIPS). The impact modified polymers typically contain as a dispersed phase from about 2 to 30 weight % of one or more rubbers selected from the group consisting of:

(a) co- or homopolymers of $C_{4-6}$ conjugated diolefins (i.e. diene rubbers);
(b) random, block, and tapered copolymers comprising from 30 to 70, preferably from 40 to 60 weight % of one or more $C_{8-12}$ vinyl aromatic monomers which are unsubstituted or substituted by a $C_{1-4}$ alkyl radical; and from 70 to 30, preferably from 60 to 40 weight % of one or more $C_{4-6}$ conjugated diolefins (e.g. styrene butadiene rubbers or SBR) and
(c) copolymers comprising from 5 to 50 weight % of acrylonitrile or methacrylonitrile and from 50 to 95 weight % of one or more $C_{4-6}$ conjugated diolefins (e.g. nitrile rubbers).

The polymers may also include acrylonitrile butadiene styrene (ABS) polymers and butyl acrylate (homopolymer) modified polyacrylates such as polymethyl methacrylate or styrene acrylates such as polymers comprising from about 5 to 50 weight % of methyl methacrylate and from about 50 to 95 weight % of a vinyl aromatic monomer as described above. The polymer may be a polyolefin such as polyethylene or copolymers of ethylene and up to about 20 weight % of a $C_{4-8}$ mono, preferably alpha, olefin such as butene, hexene and octene or a copolymer of ethylene and up to about 40 weight % of an ethylenically unsaturated carboxylic acid such as a copolymer of ethylene and acrylic acid.

In one embodiment of the present invention the dispersed monomer is styrene, which has been polymerized up to 45% conversion, typically from 10 to 45% conversion or is a solution of styrene comprising up to 45%, typically from 10 to 45% by weight of polystyrene in the styrene monomer.

In accordance with the present invention the continuous phase is, preferably, initially stationary and contained in a vessel. It contains a dispersed phase with sufficiently different density, that the particles or immiscible droplets either tend to form a layer at the free surface of the continuous phase or tend to sediment on the bottom of the vessel, if left without intervention. The initial size distribution of the dispersed phase may have been obtained as the result of mechanical agitation, atomization, extrusion, jet cutting or by other method. Typically, the dispersed phase is subsequently to be further processed or to undergo chemical reaction such as e.g. polymerization. During the processing the dispersed phase should remain submerged below the free surface of the continuous phase and be thoroughly (preferably uniformly) distributed in the continuous phase in a way that minimize interaction between particles or droplets, (e.g. particle or droplet collision) but also provides other requirements, for example an adequate heat transfer.

If the initial particle size distribution needs to be preserved to the largest extent during processing, the dispersed particles, ideally, should be distributed uniformly within a volume of the continuous phase, be exposed to a low shear and remain in a laminar motion within the continuous phase.

As used herein low shear means a shear which prevents agglomeration between dispersed phase, keeps it submerged and distributed within a continuous phase but without excessive breakup of particles or droplets, so the initial size distribution is largely (90%, preferably 95% of droplets) preserved. Generally a shear rate of less than 10 seconds$^{-1}$, preferably from 0.1 to 1 seconds$^{-1}$ may be considered low shear within the context of the present invention.

In accordance with the present invention, the required flow pattern can be created in the vessel containing dispersed and continuous phases by re-circulating or re-injecting one or more streams of the continuous phase fluid into selected locations of the vessel.

As used herein re-circulating or re-injecting means withdrawing a portion of the continuous phase from the reactor at one location (e.g. near the bottom of the reactor, if the dispersed phase has a density lower than the continuous phase and the particles buoyantly float, or from below of the free surface if the dispersed phase has a density higher than the continuous phase and the particles sink) and injecting the portion of the withdrawn continuous phase at a different location (typically, the injection ports would be at the end of the reactor opposite to the withdrawing ports).

Figure 2:
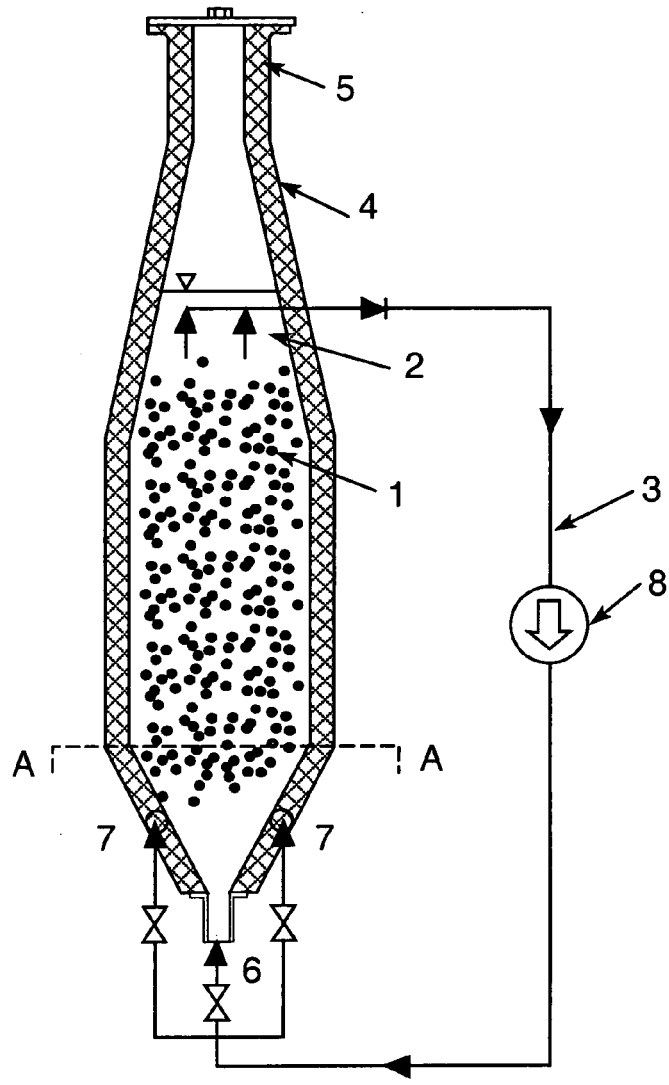
FIG. 2 is a schematic diagram of a vessel to carry out the process of the present invention.
Figure 3:
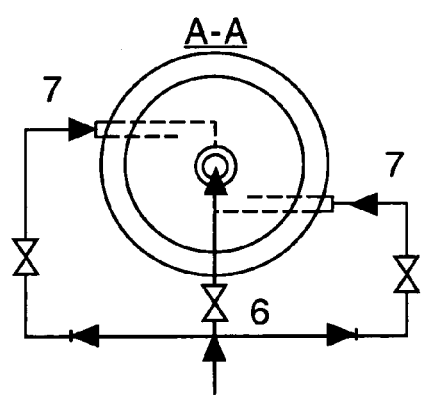
FIG. 3 is a cross section at A—A of a vessel shown in FIG. 2.

The present invention will now be described in accordance with FIGS. 2 and 3. In FIG. 2 a reactor vessel 4 having a heated jacket 5 was partially filled with a continuous water phase 2 mixed with the stabilizing agent and a dispersed phase 1, typically of partially polymerized monomer(s) such as styrene. At the bottom of the reactor is a vertical injection port 6 and on the sides of the bottom half of the reactor are two tangential injection ports 7. A portion 3 of the continuous phase is drawn from below the free surface at the top of the reactor by a pump 8 and re-circulated back to injection ports 5 and 6 and re-injected into the vessel.

In a further embodiment the upper ports could have a similar configuration as the ports through section A—A so the direction of the recycling of the continuous phase can be reversed, withdrawing the portion of continuous phase from the reactor bottom and re-injecting at the reactor top, creating a controlled low shear, low turbulence (e.g. laminar flow zone) circulation of the continuous phase. The fluid may be continuously or periodically re-circulated or re-injected, with a controlled frequency of injection and the controlled rate depending on ratio of the densities and amounts of the continuous and dispersed phases.

Preferably, the re-circulating portion of the continuous phase should be free of the dispersed phase. If the dispersed phase has a density lower than the density of the continuous phase, so the dispersed particles or droplets would float due to buoyancy forces towards free surface in the reactor, the continuous phase should be withdrawn close to the reactor bottom and re-injected to the reactor top, preferably below the free surface. If the dispersed phase has a density higher than the continuous phase so the dispersed particles or droplets have the tendency to sink or sediment on the reactor bottom, the portion of continuous phase should be withdrawn from the upper part of the vessel close to the free surface, and re-injected to the bottom part of the reactor.

Generally, the natural movement of the dispersed particles or droplets and the forced injection of the continuous phase should be in countercurrent directions, i.e. the continuous phase should be recycled in the direction opposite to the direction in which the particles would move if left without intervention and driven only by the density difference between both phases.

The recirculation of the continuous phase should create a vortex flow pattern in the vessel, so the movement of the continuous phase will keep the dispersed phase submerged but will prevent the particles or droplets from sinking (sedimentation) to the bottom of the reactor or accumulating (buoyancy) on the free surface. The dispersed particles or droplets should be in motion, flowing within the re-circulation zone and being subjected to the sufficiently low shear rate and low turbulence level so that they remain submerged without excessive mutual interaction, their momentum being sufficiently low, so even if they collide—the probability of agglomeration or breakup resulting from such a low impact collision should remain low. This motion of particles can be maintained for particles which are lighter than the continuous phase and for the particles which are heavier than the continuous phase, providing that the density difference between dispersed and continuous phase is typically within the range of ±20% (i.e. the ratio of the density of the dispersed phase to the density of the continuous phase may range from 0.8:1 to 1.2:1).

The periodic injection of the continuous phase can be particularly useful in some cases, creating an "oscillatory" movement of the particles or droplets, as during the injection period the particles or droplets move in the direction of the injected flow and next when re-circulation is shut off, the particles flow in the opposite direction driven by the density difference between both phases. The next injection should take place before the dispersed phase starts to accumulate forming a layer on the reactor bottom or on the free surface.

The withdrawn portion of the continuous phase may be re-circulated or re-injected into the continuous phase at pressure up to 15 bar (gauge) (e.g. from 0.001 to 15 bar gauge). The gauge pressure referred to in this specification is the difference between the absolute static pressure of the recycled liquid upstream the injection port, and the combined (sum of) hydrostatic pressure of continuous liquid in a vessel and an absolute ambient static pressure above free surface of continuous phase.

If the particles are of similar or the same size, the injection of the continuous phase should create a plug-flow progressing with the relatively uniform velocity profile, so all the particles are subjected to the same flow conditions. Further, the average velocity of the injected liquid measured in the cross section area of the vessel should gradually decrease as the injected liquid advances from the injection port downstream towards the withdrawal ports. This diminishing velocity of the injected/re-circulating phase will allow to suspend and stabilize the particles only within a certain layer or zone, beyond which the continuous phase velocity is too low to oppose the particle movement driven by the density difference. Such a flow pattern can be created e.g. by injecting the continuous phase through multiplicity of small ports (like through a shower head) into the conically shaped vessel, such as that shown in FIGS. 1 and 2.

The locations of the injection and withdrawing ports are selected based on the concentration of the dispersed phase and the dispersed particle density. Generally, the distance between the injection and withdrawing ports and circulation rate of the continuous liquid determine the thickness/height of the zone where the dispersed phase will be distributed. Preferably, the layer of the dispersed particles should be located between injection and withdrawing ports in such a way that it does not extend to the withdrawing port and so the withdrawing port is in contact only with the continuous phase free of the dispersed particles.

To submerge dispersed particles having a density lower than the density of the continuous phase and to prevent their floating motion, the injection ports should be above the floating particle/droplet layer and can be located in the reactor walls, above or below the free surface in the vessel.

To elevate particles/droplets heavier than continuous phase and to prevent their sedimentation on the vessel bottom, some of the injection ports can be located in the bottom of the reactor. In this case, a modification of the geometry of the reactor bottom, e.g. into an inverted conical or frustro-conical type of a shape, may be desirable. In one embodiment of the present invention (e.g. for a dispersed phase having a density greater than the continuous phase), the reactor, shown in FIG. 2, has an inverted conical bottom, with one injection port situated in the tip of the cone and two other ports located tangentially to the cone cross section, at the level of half-height of the cone.

If the density of the dispersed particles changes during the process, as for example during polymerization of the dispersed monomer droplets, a combination of both types of port arrangements (i.e. in the reactor walls and bottom) can be used. The most general arrangement of the port locations is such that the direction of the injection/withdrawal of the continuous phase can be reversed as the dispersed particles change their density with respect to the density of the continuous phase.

Mainly, the injection rate determines the level of turbulence in the created flow pattern in the reactor. The injection rate will depend on a number of factors including the volume and density ratios of the dispersed and continuous phases; the viscosity, of the continuous phase; the geometry of the vessel; and the size of the particles of the dispersed phase. One skilled in the art may determine suitable injection rates by repeating experiments similar to those contained herein.

Generally, to preserve the initial size distribution of the dispersed particles or droplets to the largest extent, the level of turbulence of the continuous flow phase in the reactor has to be sufficiently low so the motion of the reactor contents is laminar, the dispersed phase remains submerged, there is minimum of mutual interaction between particles or droplets and their momentum is sufficiently low so if they collide, the collision has low impact and particles are not deformed or destroyed as the result.

According to a further aspect of the present invention, the initial particle or droplet size distribution can be also modified to a certain extent during the processing by properly adjusting the continuous phase flow rate. Although the average particle or droplet size cannot be increased by a controlled agglomeration of particles or droplets, it can be reduced in some cases or improved towards a more uniform distribution by increasing the injection rate to cause the breakup of only the largest particles or droplets (e.g. the largest 15% of the particle size distribution) in the population. The breakup is caused by the controlled increase of the turbulence level within the flow pattern created by the recycled continuous phase and not by particle or droplet interaction (e.g. collision). In a further embodiment of the present invention, the average particle size of the dispersed phase can be substantially reduced by causing a break up of a majority (at least 85%) of the droplets in the dispersed phase. In this embodiment a flow pattern with higher shear and turbulence level is generated in the continuous phase by applying larger injection rates, to break up the droplets.

The dispersed phase may be present in the continuous phase in an amount from about 0.1 to 60 volume %, preferably from about 10 to 50 volume %, and most preferably from about 10 to 40 volume %.

Particle movement through the suspension medium (i.e. the continuous phase) may be easier and will generate a lower shear when the viscosity of the continuous phase is the same order of magnitude or, preferably, less than the viscosity of the dispersed liquid. A lower viscosity of the continuous phase also results in a lower shear stress for a given velocity gradient. The movement of particles also depends on their size, with larger particles or droplets moving with higher velocity through the suspension medium than do smaller particles or droplets. So, if possible, a certain optimization of the viscosity of the continuous phase is advantageous for a given type of the dispersed and continuous phases.

Preferably, the suspension medium (e.g. the continuous phase) has a viscosity of less than about 120, more preferably less than 100 cP. The viscosity of the dispersed liquid can generally range from above 0.1 cP, up to infinity (e.g. solid particles, for liquids typically between 100 and 6,000), but it should be equal to or larger, preferably larger, most preferably at least an order of magnitude larger than the viscosity of the continuous phase.

In addition, the continuous phase can have a sufficiently different density from that of the dispersed phase, the density difference resulting in the rise or the descent of particles or droplets through the continuous phase. Preferably, the density of the suspending medium is greater than or equal to the density of the dispersed liquid droplets or particles, with the density of the suspension medium typically being from about 1.02, to about 1.2 times the density of the dispersed particles or droplets. If the dispersed phase is subsequently polymerized, the density of the droplets or particles of the dispersed phase may change and, typically, increase. Alternatively, if the droplets of the dispersed liquid were to descend through the continuous medium, the density of the continuous medium may be from about 0.98 to about 0.90 times the density of the droplets of dispersed liquid.

Typically, the continuous phase, inert and immiscible with the dispersed phase, is water. However, mixtures of water with one or more water-miscible organic liquids may be used. The addition of organic liquids which are immiscible with the dispersed phase and may or may not be immiscible with the continuous phase, and salts may be used to vary (increase) the density of the continuous, phase.

The continuous phase (suspending medium) may contain a surfactant or suspending aid. However, it is also possible to add a stabilizing amount of the suspending aid to the dispersed phase prior to dispersion. For polymerization suitable suspending aids are those materials which stabilize the monomer or partially polymerized monomer or monomer/polymer solution phase as spheroidal droplets of a desired size and which hinder the coalescence or uncontrolled breakage of the droplets. A common surfactant is polyvinyl alcohol hydrolyzed from 75 to 95%.

The suspension stabilizer should be capable of forming a surface between the continuous phase and the dispersed particles or droplets having an interfacial tension of not less than 3, preferably not less than 8, most preferably greater than or equal to 12 dynes/cm.

In the absence of the stabilizer, the above interfacial tension values are also the minimum values required between continuous and dispersed phases.

Suspension stabilizers are well known in the art and comprise organic stabilizers, carboxymethyl cellulose, gelatin, agar, polyvinyl pyrrolidine, polyacrylamide; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier. In some cases using an extender may enhance the stabilizer effectiveness. One skilled in the art may readily determine the usefulness of any particular stabilizer or combination of stabilizers and/or extenders. The amount of stabilizer may suitably vary from 0 up to 10 weight %, usually 0.01 to 10, preferably 0.1 to 8, most preferably 0.1 to 5% by weight, based on the weight of the continuous phase. If the suspending aid or stabilizer is added to the dispersed liquid it may be added in an amount to provide the same concentration of the stabilizer in the continuous phase. Typically, a suspension stabilizer increases the viscosity of the continuous phase, affecting the motion of the dispersed particles in a way previously discussed.

Typically, the dispersed particles or droplets will have a size from about 0.1 to 10 mm, preferably from 0.3 to 3 mm, most preferably from 0.5 to about 2 mm.

If the dispersed droplets or particles are further processed in the continuous phase and the processing of the dispersed phase includes polymerization of the dispersed monomer or partially polymerized monomer or solution of polymer in monomer, the continuous phase will be heated to temperatures up to 135° C., typically not more than 130° C. and, typically, the polymerization will not be less than 95%, preferably 99%, most preferably 99.5% or greater conversion.

The present invention will now be illustrated by the following non-limiting examples, all of them comprising the dispersed phase obtained by pressure atomization of styrene monomer or partially polymerized styrene monomer, which was suspended using the re-circulation of the continuous phase comprising of water and stabilizer.

Experiments

To conduct the experiments, the styrene monomer phase was dispersed by pressure atomization into the aquatic continuous phase, contained in a reactor vessel (14) schematically shown in FIG. 1 and comprising water with dissolved polyvinyl alcohol (12). The dispersed phase (11) was injected through a central atomizing nozzle (15). The samples of the atomized droplets were photographed to record the initial size distribution. The dispersed droplets had lower density than the continuous phase so, driven by buoyancy they floated and formed a layer on the free surface in the vessel when left without intervention. To distribute the droplets within a reactor volume, a portion (13) of a continuous phase, free of droplets, was continuously withdrawn from the reactor bottom and re-injected below free surface of the continuous phase at the reactor top, so the continuous phase moved downwards from the reactor top in the opposite direction to the buoyantly floating droplets. The reactor had a conical shape, so the re-injected continuous phase descended with gradually decreasing velocity from the injection point through the increasing cross sections of the reactor. The droplets were distributed within this zone, flowing with low velocity and with minimum mutual interaction. The droplets were sampled initially and again after various residence times, photographed (under a microscope) and their size distribution was compared with the initial one.

It should be noticed that in the examples the experimental conditions were not favorable for preservation of the initial size of the dispersed phase, mainly because of two reasons. Firstly, the dispersed and continuous phases had similar and low viscosities (~1 cP) and, secondly, the interfacial surface tension between both phases was also low (~4 dyne/cm) because of the presence of the dissolved stabilizer and because of the elevated temperature of the continuous phase. Integrity of the droplets with such low viscosity and low interfacial surface tension is particularly difficult to preserve during processing as the droplets can be easily broken or even emulsified when exposed to excessive shear or turbulence. As the viscosity of the dispersed phase increases or interfacial surface tension between both phases increases, droplets are more resilient and less prone to destruction, so their size distribution can be better preserved.

Experiment 1

Figure 4:
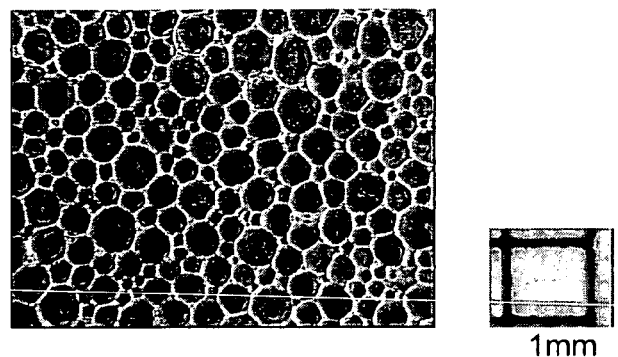
FIG. 4 is a photograph under an 8 power microscope of the dispersed phase in Example 1 at the beginning of the experiment.
Figure 5:
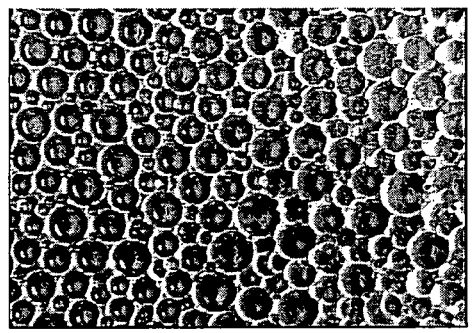
FIG. 5 is a photograph under an 8 power microscope of the dispersed phase in Example 1 after 45 minutes of residence time in the recycling flow.
Figure 6:
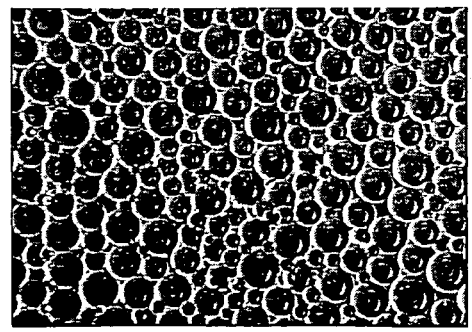
FIG. 6 is a photograph under an 8 power microscope of the dispersed phase in Example 1 after more than 1 hour of residence time in the recycling flow.

Partially polymerized styrene (5% conversion) was dispersed by atomization as described in above noted U.S. Pat. No. 6,610,798 B1 into a warm (60° C.) 1 weight % aqueous solution of polyvinyl alcohol (sold under the grade designation PVA 52-22). The droplets had an initial median size of about 0.3 mm. The dispersed droplets were subjected to recycling of the continuous phase as described in the present invention and samples of the continuous phase containing the dispersed phase were withdrawn at the beginning of the experiment, and after 45 minutes and after more than 1 hour of the residence time spent in the flow pattern generated by the recycling flow. Photographs of the samples were taken under a 8 power microscope to give FIGS. 4, 5, and 6 respectively. Comparing FIGS. 4, 5, and 6 the size distribution of the dispersed phase was substantially maintained.

Experiment 2

Figure 7:
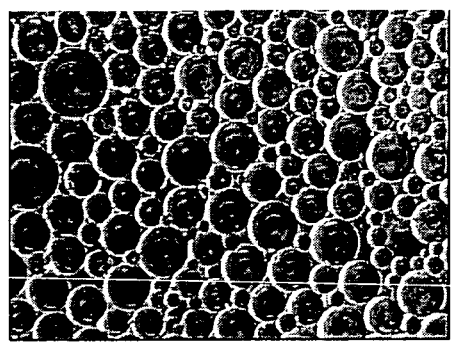
FIG. 7 is a photograph under an 8 power microscope of the dispersed phase in Example 2 at the beginning of the experiment.
Figure 8:
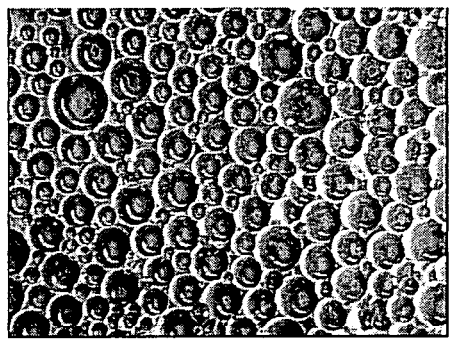
FIG. 8 is a photograph under an 8 power microscope of the dispersed phase in Example 2 after 40 minutes of residence time in the recycling flow.
Figure 9:
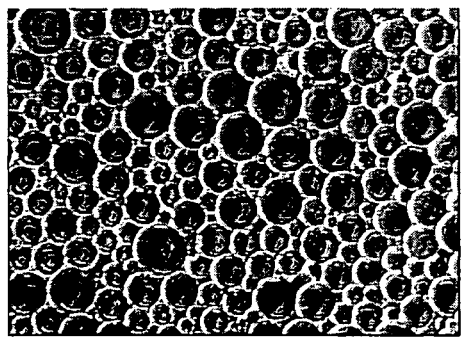
FIG. 9 is a photograph under an 8 power microscope of the dispersed phase in Example 2 after 1 hour and 20 minutes of residence time in the recycling flow.

Partially polymerized styrene (5% conversion) was dispersed by atomization as described in above noted U.S. Pat. No. 6,610,798 B1 into a warm (60° C.) 2 weight % aqueous solution of polyvinyl alcohol (sold under the grade designation PVA 52-22). The droplets had an initial median size of about 0.3 mm. The dispersed droplets were subjected to recycling of the continuous phase as described in the present invention and samples of the continuous phase containing the dispersed phase were withdrawn at the beginning of the experiment, and after 40 minutes and after 1 hour and 20 minutes of the residence time spent in the flow pattern generated by the recycling flow. Pictures of the samples were taken under a 8 power microscope to give FIGS. 7, 8, and 9 respectively. Comparing FIGS. 7, 8, and 9, the size distribution of the dispersed phase was substantially maintained.

Experiment 3

Figure 10:
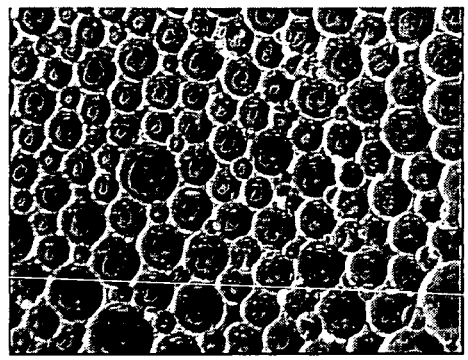
FIG. 10 is a photograph under an 8 power microscope of the dispersed phase in Example 3 at the beginning of the experiment.
Figure 11:
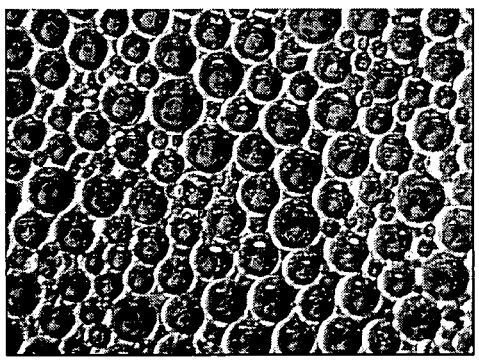
FIG. 11 is a photograph under an 8 power microscope of the dispersed phase in Example 3 after 45 minutes of residence time in the recycling flow.
Figure 12:
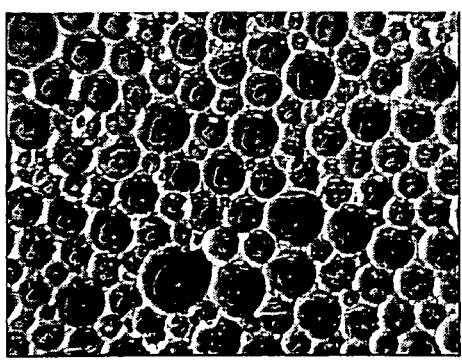
FIG. 12 is a photograph under an 8 power microscope of the dispersed phase in Example 3 after 1 hour and 20 minutes of residence time in the recycling flow.

Styrene was dispersed by atomization as described in above noted U.S. Pat. No. 6,610,798 B1 into a warm (60° C.) 1 weight % aqueous solution of polyvinyl alcohol (sold under the grade designation PVA 50-42). The droplets had an initial median diameter of about 0.3 mm. The dispersed droplets were subjected to recycling of the continuous phase as described in the present invention and samples of the continuous phase containing the dispersed phase were withdrawn at the beginning of the experiment, after 45 minutes and after more than 1 hour of the residence time spent in the flow pattern generated by the recycling flow. Pictures of the samples were taken under a8 power microscope to give FIGS. 10, 11, and 12 respectively. Comparing FIGS. 10, 11, and 12, the size distribution of the dispersed phase was substantially maintained.

Experiment 4

Figure 13:
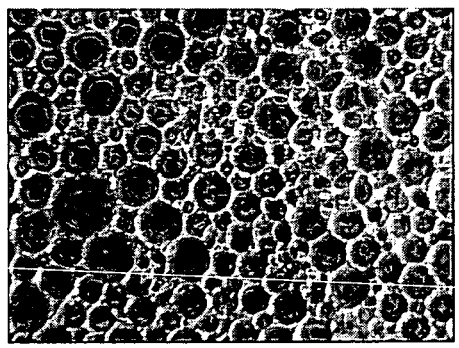
FIG. 13 is a photograph under an 8 power microscope of the dispersed phase in Example 4 at the beginning of the experiment.
Figure 14:
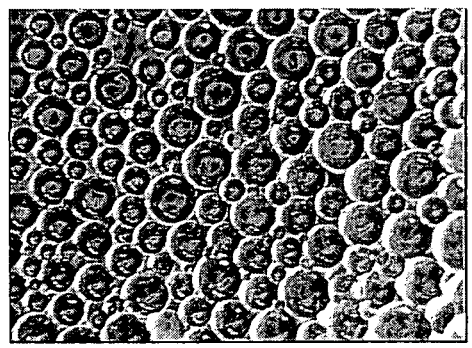
FIG. 14 is a photograph under an 8 power microscope of the dispersed phase in Example 4 after 30 minutes of residence time in the recycling flow.
Figure 15:
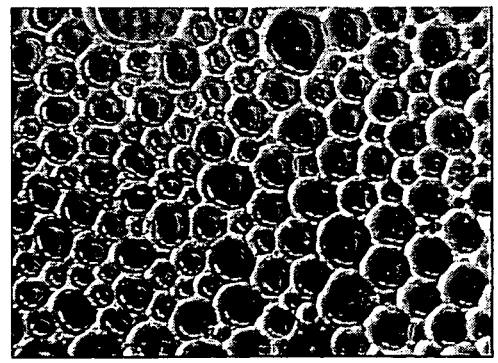
FIG. 15 is a photograph under an 8 power microscope of the dispersed phase in Example 4 after 50 minutes of residence time in the recycling flow.

Styrene was dispersed by atomization as described in above noted U.S. Pat. No. 6,610,798 B1 into a warm (40° C.) 2 weight % aqueous solution of polyvinyl alcohol (sold under the grade designation PVA 50-42). The droplets had an initial median diameter of about 0.2 mm. The dispersed droplets was subject to recycling of the continuous phase as described in the present invention and samples of the continuous phase containing the dispersed phase were withdrawn at the beginning of the experiment, and after 30 minutes and after 50 minutes of the residence time spent in the flow pattern generated by the recycling flow. Photographs of the samples were taken under a 8 power microscope to give FIGS. 13, 14, and 15 respectively. Comparing FIGS. 13, 14, and 15, the size distribution of the dispersed phase was substantially maintained.

What is claimed is:

1. A process for creating without mechanical agitation a flow pattern in a continuous liquid phase contained in a reaction vessel and comprising a dispersed phase selected from the group consisting of solid particles which can also be coated or immiscible liquid droplets, the dispersed phase having a density different from the density of the continuous phase and undergoing processing during which the particles or droplets need to remain submerged and uniformly distributed within the continuous phase, by continuously or periodically withdrawing a portion of the continuous phase and injecting it into the reactor above or, below the free surface of the continuous phase in a direction opposite to the natural displacement/motion of the dispersed phase driven by density difference, at a rate to substantially prevent flotation or sedimentation or coalescence of the dispersed phase.

2. The process according to claim 1, wherein the density of the dispersed phase differs from the density of the continuous phase by ±20%.

3. A process according to claim 2, wherein not less than 90% of the initial particle size distribution of the dispersed phase is preserved.

4. The process according to claim 3, wherein the dispersed phase is present in an amount from 0.1 to 60 volume % of the continuous phase and the dispersed phase has an average particle diameter from 0.1 mm to 10 mm.

5. The process according to claim 4, wherein the continuous phase is selected from the group consisting of water and mixtures of water and one or more water miscible organic liquids.

6. The process according to claim 5, wherein the continuous phase further comprises from 0.01 to 10 weight % based on the weight of the continuous phase of one or more polymeric surfactants.

7. The process according to claim 6, wherein the dispersed phase is selected from the group consisting of one or more monomers which may be emulsion or suspension polymerized and or solutions of polymers in one or more monomers which can be emulsion or suspension polymerized.

8. The process according to claim 7, wherein the monomers are selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

9. The process according to claim 8, wherein the dispersed phase is selected from the group consisting of monomer polymerized up to 45% conversion, and a solution of monomers comprising up to 45%, of polymer of one or more of the solvent monomers.

10. The process according to claim 9, wherein the dispersed phase comprises from 100 to 60 weight % of styrene and from 0 to 40 weight % of one or more monomers selected from the group consisting of methyl methacrylate, ethyl methacrylate, methyl acrylate, ethyl acrylate, and butyl acrylate.

11. The process according to claim 10, further comprising subjecting the dispersed liquid phase to polymerization to not less than 95% conversion at a final temperature up to 130° C.

12. The process according to claim 11, wherein the viscosity of the continuous phase is between 1 and 120 cP, and the viscosity of the dispersed liquid is equal to or larger than that of the continuous phase.

13. The process according to claim 12, wherein the continuous phase is water.

14. The process according to claim 13, wherein the polymeric surfactant is polyvinyl alcohol hydrolyzed from 75 to 95%.

15. The process according to claim 14, wherein the dispersed phase has a density lower than the continuous phase.

16. The process according to claim 15, wherein the continuous phase is withdrawn from the lower part of the reactor and re-injected to the upper part of the reactor below the free surface of the continuous phase at a flow rate sufficiently high so that the average velocity of the continuous phase in the re-circulation zone is equal to and opposite the average buoyancy velocity of the dispersed particles so they flow without excessive agglomeration or breakup in the re-circulation zone in the reactor.

17. The process according to claim 16, wherein the portion of the continuous phase withdrawn from the reactor for re-circulation is substantially free of the discontinuous phase.

18. The process according to claim 17, wherein the continuous phase is withdrawn from the bottom third of the reactor and injected into the upper third of the reactor.

19. The process according to claim 18, wherein the discontinuous phase is subjected to polymerization in the presence of from 5 to 10 weight % based on the weight of the discontinuous phase of a blowing agent.

20. The process according to claim 14, wherein the discontinuous phase has a density greater than the continuous phase.

21. The process according to claim 20, wherein the continuous phase is withdrawn from the upper part of the reactor below the free surface of the continuous phase and re-injected to the lower part of the reactor at a flow rate sufficiently high so that the average velocity of the continuous phase in the re-circulation zone is equal to and opposite the average sedimenation/sinkage velocity of the dispersed particles so they flow without agglomeration or breakup in the re-circulation zone in the reactor.

22. The process according to claim 21, wherein the portion of the continuous phase withdrawn from the reactor for re-circulation is substantially free of the dispersed phase.

23. The process according to claim 22, wherein the continuous phase is withdrawn from the top third of the reactor and injected into the lower third of the reactor.

24. The process according to claim 23, wherein the discontinuous phase is subjected to polymerization in the presence of from 5 to 10 weight % based on the weight of the discontinuous phase of a blowing agent.

25. A process according to claim 2, to alter the initial particle size distribution of a dispersed phase in a continuous phase comprising withdrawing and re-injecting a portion of the continuous phase at a rate to induce within the continuous phase a flow pattern with a level of turbulence to cause a breakup of the 15% of the largest droplets or particles in the population, and to a create more uniform size distribution of the dispersed phase.

26. A process for creating without mechanical agitation a flow pattern in a continuous liquid phase contained in a reaction vessel and comprising 0.1 to 60 volume % of a dispersed phase selected from the group consisting of solid particles which can also be coated or immiscible liquid droplets, the dispersed phase having an average particle or droplet diameter from 0.1 mm to 10 mm and a density different from the continuous phase and undergoing processing during which the initial size distribution of the particles or droplets need to be reduced and the dispersed phase needs to remain submerged and uniformly distributed within the continuous phase, comprising continuously or periodically withdrawing and re-injecting into selected part (s) of the reaction vessel one or more streams of continuous phase to cause a secondary break up of at least 85% of the dispersed phase droplet population creating a smaller size of the overall size distribution of the dispersed phase.

* * * * *